United States Patent Office 3,614,972
Patented Oct. 26, 1971

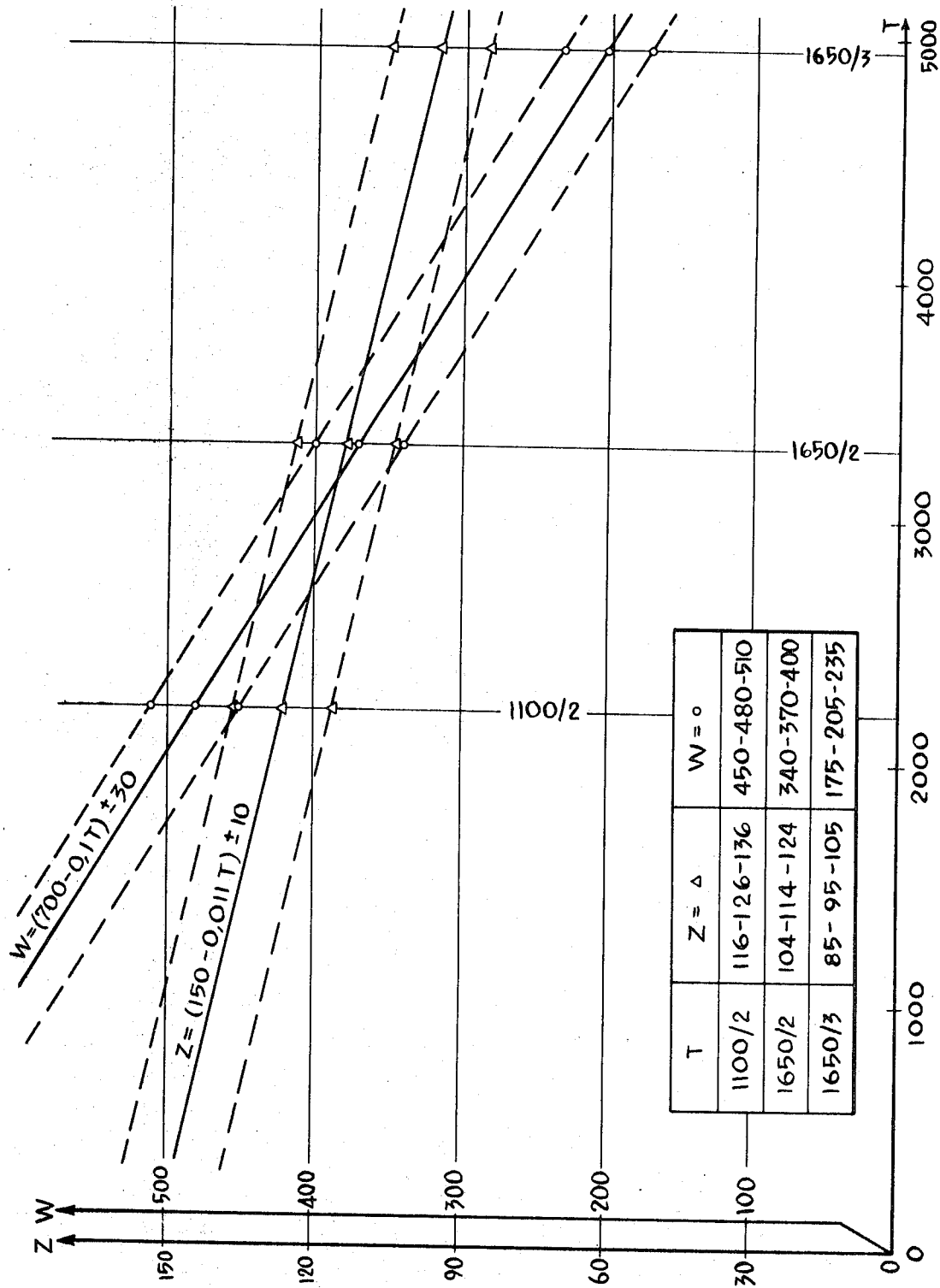

3,614,972
PNEUMATIC TIRE
Werner Görter, Baden, Austria, assignor to Semperit Osterreichisch-Amerikanische Gummiwerke Aktiengesellschaft, Vienna, Austria
Filed Apr. 7, 1969, Ser. No. 822,813
Claims priority, application Austria, April 10, 1968,
A 3,513/68
Int. Cl. B60c 9/04
U.S. Cl. 152—356                              2 Claims

ABSTRACT OF THE DISCLOSURE

A pneumatic tire provided with reinforcing tire cords of twisted textile threads wherein the total twist of the threads W is given by:

$$W = (700 - 0.1T) \pm 30$$

where T is the total denier of the cord, and the number of threads Z per 10 cm. measured at the crown of the tire perpendicular to the cords is given by:

$$Z = (150 - 0.011T) \pm 10$$

---

The invention relates to pneumatic tires for vehicles provided with belt inserts of twisted textile threads.

Threads of materials of more or less high tensile strength are used for building tire carcasses and reinforcing inserts. These so-called cord threads consist of individual yarns, which can where necessary already be twisted, and which can again be twisted with one another. Conventional cords consist, for example of rayon (artificial silk) and are stranded from a yarn which weighs for example 1100 g./10,000 yards or from a yarn which weighs 1650 g./10,000 yards. In accordance with whether two or three such yarns are stranded with one another to form the cord, the cord produced is referred to as, for example, 1100/2, 1650/2 or 1650/3 cord.

It is the aim of every tire construction on the one hand to select a material having a certain stiffness, tensile strength and the like for the carcass, and on the other hand a material with correspondingly different properties for the reinforcing inserts. In particular, the stiffening effect of the reinforcing inserts is mainly dependent upon the stiffness of the thread and its stretching.

It is, in fact, known, that the stiffness of a thread and thus also its driving behavior (in particular the side bearing force) and the frictional wear decreases in the sequence of materials: steel wire-rayon-polyester-polyamide. However, travelling comfort, as well as the resistance to fatigue breakdowns and separations of the threads increase in roughly the same sequence. Thus, by appropriate selection of the material and of the dimensions used, it is to a certain extent possible to give the tires the desired properties within the scope of the given possibilities.

With increasing rate of revolution, the stretch and thus the travelling comfort as well as the resistance to fatigue breakdowns and separations increase, but the stiffness, abrasion strength and the driving behavior (side bearing force) decrease; in contrast to this, with decreasing rate of revolution, the stretch and thus the travelling comfort as well as the resistance to fatigue breakdowns and separations decrease, whilst at the same time the stiffness, the driving behavior (side bearing force) and the abrasion strength increase.

Various stranding numbers are known for the cords used by the use of which, however, the optimum stiffening effect cannot be achieved simultaneously with optimum durability of the thread. Hitherto, it has been attempted to control the stretch, stiffness etc. exclusively by the selection of material and the cord dimensions but it has been found that other properties are unfavourably influenced by a material having high stretch. A number of tested, commercial tires, however, possess very greatly varying twisting, since hitherto no connection between stretch and optimum tire properties had been taken into account in any way.

It is an object of the present invention to provide a pneumatic tire for vehicles with a reinforcing cord insert of twisted textile threads, in which the optimum properties are to a large extent achieved by fixing the yarn and thread twist, and the number of threads per 10 cm. at the crown of the finished tire perpendicular to the individual threads.

It has been found that in order to achieve a particular stiffness and a stretch behavior going hand in hand with this, with different thickness of cord (in dependence upon the material used), a different number of winding per meter length must be selected. Thus, it was found that when artificial silk (rayon) was used for reinforcing inserts, the following values apply:

| Designation of the cord | Thickness of the cord in mm. | Number of— Turns per meter length | Thread per 10 cm. |
|---|---|---|---|
| 1100/2 | 0.58 | 450–510 | 116–136 |
| 1650/2 | 0.68 | 340–400 | 104–124 |
| 1650/3 | 0.85 | 175–235 | 85–105 |

Thus, in accordance with the above table, the following formula applies for the number of turns (W) with a given total denier T of the cord:

(1) $$W = (700 - 0.1T) \pm 30$$

For determining the thread count (Z) (number of threads per 10 cm. at the crown of the finished tire measured perpendicularly to the individual cords), the following formula is given by column 4 of the above table:

(2) $$Z = (150 - 0.011T) \pm 10$$

According to the invention, therefore, there is provided a pneumatic tire for vehicles provided with reinforcing inserts of cords formed of twisted textile threads, wherein, in order to avoid creasing or deformation, the twist of the threads in the yarns and the yarns in the cord is given by the formula:

$$W = (700 - 0.1T) \pm 30$$

where W is the number of turns per meter length and T is the total denier of the cord; and wherein the number of threads per 10 cm. at the crown of the finished tire measured perpendicularly to the direction of the individual cords is given by the formula:

$$Z = (150 - 0.011T) \pm 10$$

where Z is the number of threads and T is again the total denier of the cord.

The ranges in accordance with the two formulae are illustrated in the accompanying drawing which is a graph of the winding number W and the thread count Z in dependence upon the denier T.

Nowadays, it is exclusively Z/S twisted cords which are used. The designation "cord" for these is, in fact, erroneous, but it has come into general usage. In actual fact, individual thread bundles are initially twisted in one direction (Z), and then a plurality of such strands are stranded in the opposite direction (S), which is known now as cording. It would be impossible to twist and strand in the same turning direction, since the yarn (the "cord") would unravel. Previously, a number of yarns were corded to form the cord the last twisting direction having to be different from the previous one, but the two previous ones could be the same (*S/Z/S* or *Z/Z/S*).

As already mentioned, both the thread twisting (Z) and the yarn or cord twisting (S) must be included within the scope of the invention.

By the selection of a different material for the threads while the dimensions remain the same, the tire properties are changed only in as far as corresponds to the other material. Surprisingly, it has been found that the ranges in accordance with the invention are almost equal for the various textile materials. The optimum turns and thread counts for belts of polyester cord and polyamide cord are within the spread of the given limits. It is of course correct that polyamide has a greater stretch than, for example, artificial silk. The absolute tire properties will therefore be different. However, the optimum is in this case within the given range. For example, artificial silk could be less greatly twisted and polyamide could be twisted so little that the same stretch is achieved; however, as previously mentioned, the invention is not dependent upon this, but on the optimising of a number of properties.

Artificial silk with a greater stretch does, in fact, have greater stretch, but also a lesser degree of stiffness. Thus, if for a certain tire, a greater stretch by itself is required, polyamide is used. The optimum in relation to the other properties will then, as mentioned, lie somewhere other than with the artificial silk tires, but will have been achieved by the adherence to the limits given by the present invention.

What we claim as our invention and desired to secure by Letters Patent of the United States is:

1. A pneumatic tire for vehicles provided with reinforcing inserts of cords formed of twisted textile threads, wherein, in order to avoid creasing or deformation, the twist of the threads in the yarns and of the yarns in the cord is given by the formula:

$$W = (700 - 0.1T) \pm 30$$

where W is the number of turns per meter length and T is the total denier of the cord; and wherein the number of threads per 10 cm. at the crown of the finished tire measured perpendicularly to the direction of the individual cords is given by the formula:

$$Z = (150 - 0.011T) \pm 10$$

where Z is the number of threads and T is again the total denier of the cord.

2. A pneumatic tire as claimed in claim 1 wherein said cords are made of rayon, polyamide or polyester material.

References Cited

UNITED STATES PATENTS

| | | | |
|---|---|---|---|
| 2,188,174 | 1/1940 | Casticum et al. | 152—359 |
| 2,235,867 | 3/1941 | Casticum | 152—359 |
| 3,160,193 | 12/1964 | Baggett et al. | 152—359 |

FOREIGN PATENTS

| | | | |
|---|---|---|---|
| 108,715 | 1939 | Australia | 152—359 |

ARTHUR L. LA POINT, Primary Examiner

R. SAIFER, Assistant Examiner

U.C. Cl. X.R.

57—104 C, 153; 152—359